(12) United States Patent
Wardle et al.

(10) Patent No.: US 11,261,958 B2
(45) Date of Patent: Mar. 1, 2022

(54) CONTROL OF A VEHICLE HAVING AN AUTOMATIC TRANSMISSION TO COMPENSATE FOR AMBIENT AIR DENSITY

(71) Applicant: JAGUAR LAND ROVER LIMITED, Coventry (GB)

(72) Inventors: Roger Wardle, Coventry (GB); Paul Timothy, Coventry (GB); Thomas Owen, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/977,842

(22) PCT Filed: Mar. 4, 2019

(86) PCT No.: PCT/EP2019/055270
§ 371 (c)(1),
(2) Date: Sep. 3, 2020

(87) PCT Pub. No.: WO2019/170581
PCT Pub. Date: Sep. 12, 2019

(65) Prior Publication Data
US 2021/0025489 A1    Jan. 28, 2021

(30) Foreign Application Priority Data
Mar. 7, 2018 (EP) .......................... 803644

(51) Int. Cl.
*B60W 40/02* (2006.01)
*F16H 61/02* (2006.01)
(Continued)

(52) U.S. Cl.
CPC ......... *F16H 61/0213* (2013.01); *B60W 10/10* (2013.01); *B60W 40/02* (2013.01);
(Continued)

(58) Field of Classification Search
CPC ......... B60W 10/0235; B60W 2540/10; B60W 2552/15; B60W 10/10; B60W 40/02;
(Continued)

(56) References Cited

U.S. PATENT DOCUMENTS 4,961,315 A   10/1990  Ishikawa et al.
5,501,644 A   3/1996   Zhang
(Continued)

FOREIGN PATENT DOCUMENTS

CN    104071152 A      10/2014
CN    105620465 A  *   6/2016
(Continued)

OTHER PUBLICATIONS

English translation of WO2016156716A1; http://translationportal.epo.org; Aug. 17, 2021 (Year: 2021).*
(Continued)

*Primary Examiner* — Roger L Pang
(74) *Attorney, Agent, or Firm* — Carlson, Gaskey & Olds, P.C.

(57) ABSTRACT

Control of a Vehicle Having an Automatic Transmission to Compensate for Ambient Air Density A method of controlling an automatic transmission (24) of a vehicle (10), the method comprising: receiving a signal indicative of a vehicle operating mode; obtaining a base map defining gear shift points for the transmission (24) based on the indicated vehicle operating mode; obtaining a torque loss map defining gear shift points for the transmission (24) based on a predetermined minimum value of density; and controlling the transmission (24) based on the base map if the base map defines gear shift points at higher engine speeds or vehicle speeds than the corresponding gear shift points defined by the torque loss map.

18 Claims, 4 Drawing Sheets

(51) Int. Cl.
*B60W 10/10* (2012.01)
*F16H 59/62* (2006.01)
*F16H 59/64* (2006.01)
*B60W 10/02* (2006.01)

(52) U.S. Cl.
CPC ............. *F16H 59/62* (2013.01); *F16H 59/64* (2013.01); *B60W 10/0235* (2020.02); *B60W 2540/10* (2013.01); *B60W 2552/15* (2020.02); *F16H 2061/0223* (2013.01); *F16H 2061/0227* (2013.01); *F16H 2061/0234* (2013.01)

(58) Field of Classification Search
CPC ........... B60W 2555/20; B60W 2555/40; F16H 61/0213; F16H 59/62; F16H 59/64; F16H 2061/0223; F16H 2061/0234
USPC ...................................... 701/55, 56
See application file for complete search history.

(56) References Cited

U.S. PATENT DOCUMENTS

2002/0065167 A1* 5/2002 Yeo ..................... F16H 61/0213
477/97

| | | | |
|---|---|---|---|
| 2015/0039192 | A1 | 2/2015 | Gauthier |
| 2015/0345622 | A1* | 12/2015 | Sujan ..................... F16H 59/74 |
| | | | 701/55 |

FOREIGN PATENT DOCUMENTS

| | | | |
|---|---|---|---|
| DE | 19542046 A1 | | 5/1996 |
| GB | 2527511 A | | 12/2015 |
| GN | 103895637 A | | 7/2014 |
| GN | 104179962 A | | 12/2014 |
| JP | 2000065195 A | * | 3/2000 |
| JP | 2017194101 A | * | 10/2017 |
| WO | 2016/156716 A1 | | 10/2016 |

OTHER PUBLICATIONS

Combined Search and Examination Report under Sections 17 and 18(3) for Application No. GB1803644.2 dated Aug. 31, 2018.
International Search Report and Written Opinion of the International Searching Authority for International application No. PCT/EP2019/055270 dated May 20, 2019.

* cited by examiner

CONTROL OF A VEHICLE HAVING AN AUTOMATIC TRANSMISSION TO COMPENSATE FOR AMBIENT AIR DENSITY

TECHNICAL FIELD

The present disclosure relates to the control of a vehicle having an automatic transmission to compensate for ambient air density. In particular, but not exclusively, the disclosure relates to the control of a vehicle having a turbocharged engine and an automatic transmission at high altitude. Aspects of the invention relate to a method, to a controller, to a computer program product and to a vehicle.

BACKGROUND

In a turbocharged engine system, an exhaust-driven turbine transfers torque to a compressor that pumps air into an engine intake at a pressure that is elevated above ambient. This increases the performance of the engine relative to a naturally-aspirated equivalent. However, at low engine speeds the exhaust flow rate may be insufficient to drive the compressor adequately, leading to a loss of acceleration until the compressor 'spools up', which is commonly referred to as 'turbo lag'.

Turbo lag is typically exacerbated when the density of ambient air is low. Ambient air may have low density when a vehicle travels at high altitude, for example, due to the reduced barometric pressure of ambient air. Alternatively, or in addition, low air density can also arise when the ambient temperature is high. Therefore, a vehicle travelling at sea level in high ambient temperature conditions may be subject to a similar exacerbation of turbo lag to a vehicle travelling at high altitude.

In each case, reduced air density raises the engine speed at which the turbocharger begins to provide effective boosting to engine performance, therefore extending the proportion of the engine speed range over which the engine is effectively naturally-aspirated, or indeed effectively has a restricted intake, and so has a significantly reduced output.

Moreover, the base performance of any engine reduces when the density of intake air is low, especially at high altitudes where the oxygen content of air is reduced. This applies whether the engine is turbocharged, supercharged or naturally-aspirated. In a turbocharged engine, although the torque output when the turbocharger is actively boosting is relatively unaffected by intake air density, the torque output when the engine is not boosted is significantly lower if the air intake density is low. This leads to a more pronounced drop in performance while the compressor spools than would be experienced at sea level, in addition to the exacerbated turbo lag.

Extended turbo lag and diminished performance while spooling can be problematic in vehicles having automatic transmissions, as the usual gear upshift points may not provide acceptable performance at high altitude, for example, and could even result in an upshift occurring before the turbocharger has begun to provide boosting. This in turn would result in continuous low engine output, which may be a particular problem if the vehicle encounters a gradient, in that premature gear shifts could render the vehicle unable to tackle the climb.

Correspondingly, in a vehicle having an engine that is turbocharged, supercharged or naturally-aspirated, an automatic transmission may fail to account for the reduced engine output at high altitude or high ambient temperature, and effect gear changes too early.

It is noted that road gradient has an impact on the control of automatic transmissions, since an increase in gradient entails a corresponding rise in both the vehicle load and the stall speed of a torque converter of the transmission. In view of this, it is known to compensate for increasing road gradient by controlling the transmission to adopt a more aggressive profile, so that gear shifts are implemented at higher engine speeds relative to when travelling on a level surface.

For example, the transmission may be controlled based on gear shift maps, which define the points at which gear changes are triggered in accordance with inputs including the engine speed and the accelerator pedal position. So, for example, the gear shift map may indicate that, for a particular gear ratio, the gear shift point is at a higher engine speed when the pedal is fully depressed than when the pedal is depressed to a lesser extent. This acknowledges that fully depressing the pedal typically indicates a driver demand for high acceleration.

The gear shift map is therefore a two-dimensional function, in that the shift points that it defines vary with respect to both engine speed and pedal position.

A set of gear shift maps may be used, each corresponding to a particular range of gradients, with the appropriate map selected for the current estimation of road gradient. Moreover, each vehicle operating mode may be assigned a respective set of gear shift maps that are compensated for a range of gradients. For example, a set of gradient compensated maps is defined for a 'sport' mode, and another set of maps is defined for a 'drive' mode.

Each map is compensated for a particular discrete gradient. For example, the set of maps may include a shift map for 2% gradient, 6% gradient, and so on. To provide effective control at gradients not precisely matching these discrete values, the pair of maps relating to gradients immediately above and below the estimated gradient are identified, and the gearshift points to implement based on the actual estimated gradient are determined using linear interpolation. For example, if the estimated gradient is 4%, the vehicle interpolates between the map for 2% gradient and the map for 6% gradient to produce a set of shift points corresponding to a 4% gradient.

One such approach is described in the Applicant's earlier UK patent, GB2527511, in which a road gradient estimation is derived from information obtained by scanning road signs, and an appropriate gear shift map is selected. In other arrangements, the road gradient may be estimated by comparing the engine torque with the vehicle acceleration, for example.

Building on this, in a crude approach to addressing increased turbo lag and/or diminished engine output at high altitude, an offset may be added to the vehicle gradient estimation. The offset is proportional to the ambient barometric pressure as measured by an on-board sensor, typically positioned within the engine bay. Thus, the transmission selects a gear shift map corresponding to a higher gradient than that of the road on which the vehicle is actually travelling. Therefore, even when the vehicle travels on a level road, if the detected barometric pressure is sufficiently low the vehicle is treated as if it were travelling uphill.

This approach avoids major problems such as an inability to climb a hill at high altitude, but lacks refinement due to the indirect way in which altitude is compensated for.

Moreover, as already noted it is not altitude per se that impacts on engine performance, but the density of engine intake air, which is also influenced by ambient temperature. With this in mind, it is clear that using a gradient offset based only on barometric pressure to approximate for varying air density cannot possibly produce optimised results.

It is against this background that the present invention has been devised.

SUMMARY OF THE INVENTION

According to an aspect of the present invention there is provided a method of controlling an automatic transmission of a vehicle. The method comprises: receiving a signal indicative of a vehicle operating mode; obtaining a base map defining gear shift points for the transmission based on the indicated vehicle operating mode; obtaining a torque loss map defining gear shift points for the transmission based on a predetermined minimum value of air density; and controlling the transmission based on the base map if the base map defines gear shift points at higher engine speeds or vehicle speeds than the corresponding gear shift points defined by the torque loss map.

It is noted that the terms 'engine speeds' and 'vehicle speeds' do not limit the method to use with direct measurements of vehicle speed or engine speed, but also encompass indirect measurements such as a speed of a transmission shaft or of an output shaft from a torque converter.

The gear shift points defined by the base map may also be based on a predetermined value of air density which is greater than the predetermined minimum air density on which the gear shift points of the torque loss map are based.

By using the base map when it defines a more aggressive gear change strategy than the compensated map, the above method beneficially ensures that the most aggressive shifting strategy is used at all times. This ensures that the shifting strategy used is always sufficiently aggressive to provide adequate compensation for changing ambient air density, without failing to meet the driver's expectations when an aggressive vehicle driving mode is selected.

The method may comprise receiving one or more signals indicative of ambient air density, and obtaining a compensated map defining gear shift points for the transmission based on the or each signal indicative of ambient air density. The one or more signals indicative of ambient air density may comprise, for example, any one or more of: a signal indicative of barometric pressure; a signal indicative of temperature; and navigational data. In such embodiments, obtaining the compensated map optionally comprises interpolating between the torque loss map and the base map in accordance with the or each signal indicative of ambient air density, in which case the method may comprise determining an interpolation factor based on the one or more signals indicative of ambient air density, and interpolating between the torque loss map and the base map according to the interpolation factor.

The method may comprise obtaining a signal indicative of a gradient of a surface on which the vehicle is positioned by estimating a gradient of a surface on which the vehicle is positioned, or receiving a signal indicative of a gradient of a surface on which the vehicle is positioned.

When an indication of gradient is available, obtaining the torque loss map may comprise selecting a torque loss map from a set of torque loss maps based on the indicated gradient, where each torque loss map of the set is calibrated for a respective surface gradient. In such embodiments, the method may comprise selecting a pair of torque loss maps from the set of torque loss maps, and interpolating between the pair of torque loss maps to generate a torque loss map for the indicated gradient of the surface on which the vehicle is positioned. The or each torque loss map may be selected independently of vehicle operating mode, and each torque loss map of the set of torque loss maps may be based on surface gradient and not on vehicle operating mode. Such methods may also comprise adjusting the base map according to the estimated gradient, where adjusting the base map optionally comprises selecting a base map from a set of base maps based on the indicated gradient of a surface on which the vehicle is positioned, each base map of the set being calibrated for a respective surface gradient. In this case, the method may comprise selecting a pair of base maps from the set of base maps, and interpolating between the pair of base maps to generate a base map for the indicated gradient of the surface on which the vehicle is positioned.

The method may comprise receiving a signal indicative of a position of an accelerator pedal of the vehicle, in which case the base map may define engine speeds or vehicle speeds at which gear changes are effected based on the signal indicative of the position of the accelerator pedal. Alternatively, or in addition, the torque loss map may define engine speeds or vehicle speeds at which gear changes are effected based on the signal indicative of the position of the accelerator pedal. Where such embodiments include the steps of obtaining a compensated map defining gear shift points for the transmission based on signals indicative of ambient air density, the compensated map may define engine speeds or vehicle speeds at which gear changes are effected based on the signal indicative of the position of the accelerator pedal. Such methods may also comprise monitoring the signal indicative of the position of the accelerator pedal to characterise driver behaviour, and adjusting the base map according to the driver behaviour.

The method may comprise updating points at which a torque converter of the automatic transmission is locked and unlocked in accordance with the gear shift points by which the transmission is controlled.

The invention also extends to a controller configured to implement the method of the above aspect, to a vehicle including such a controller, to a computer program product comprising computer readable code for controlling a computing device to perform the method of the above aspect, and to a non-transitory computer readable medium comprising such a computer program product.

Another aspect of the invention provides a controller configured to control an automatic transmission of a vehicle. The controller comprises: an input arranged to receive a signal indicative of a vehicle operating mode; a base map module configured to obtain a base map defining gear shift points for the transmission based on the indicated vehicle operating mode; a torque loss map module configured to obtain a torque loss map defining gear shift points for the transmission based on a predetermined minimum value of air density; a comparator configured to compare the base map with the torque loss map to determine whether the base map defines gear shift points at higher engine speeds than the corresponding gear shift points defined by the torque loss map; and an output configured to issue control commands for controlling the transmission based on the base map if the base map defines gear shift points at higher engine speeds than the corresponding gear shift points defined by the torque loss map.

The invention also extends to a vehicle comprising an automatic transmission and a controller of the above aspect for controlling the transmission.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
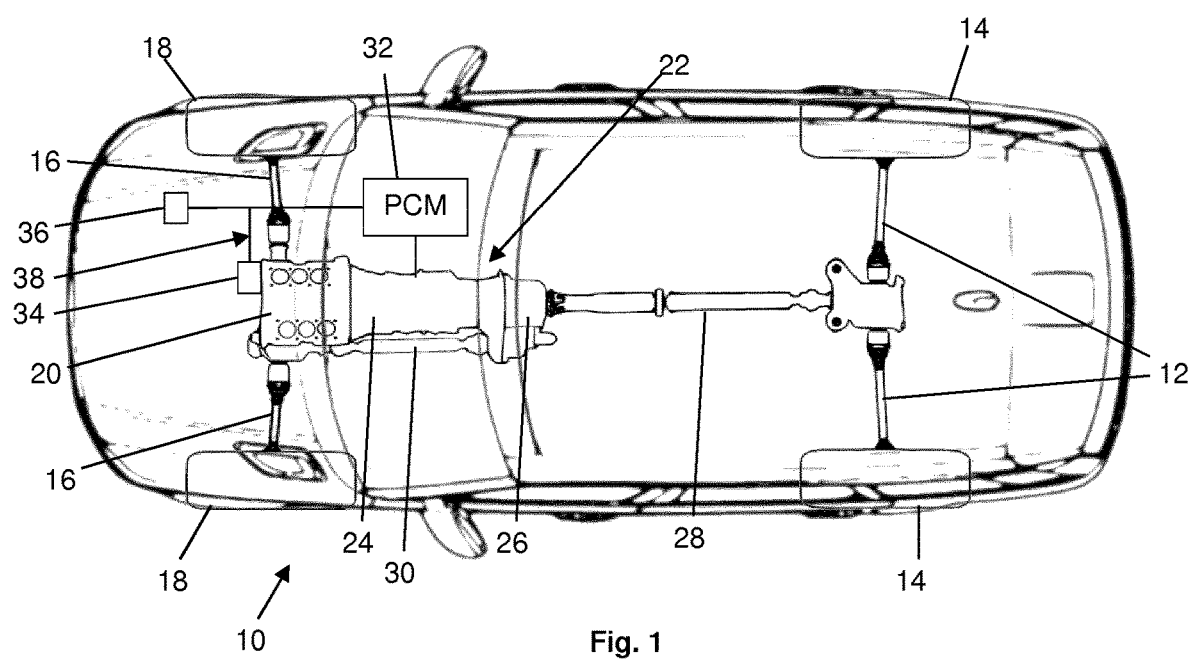
FIG. 1 is a schematic illustration of a vehicle that is suitable for use with embodiments of the invention.

FIG. 1 shows in schematic form a vehicle 10 that is suitable for use in embodiments of the invention.

The vehicle 10 adopts a split-axle layout of a kind that will be familiar to the skilled person, in which a pair of mutually-opposed rear axles 12 support respective coaxial rear road wheels 14, and a pair of mutually-opposed front axles 16 support respective coaxial front road wheels 18.

The vehicle 10 includes an internal combustion engine 20 that is disposed on a central longitudinal axis of the vehicle 10 between the front road wheels 18. In this example, the engine 20 drives all four road wheels 14, 18, so that the vehicle 10 is a 'four-wheel drive' vehicle.

Although not visible in FIG. 1, the engine 20 includes a turbocharger comprising an exhaust-driven turbine coupled to a compressor that pumps air into an intake of the engine 20 to increase engine performance. Thus, the vehicle 10 of FIG. 1 is susceptible to the above-described problem of exacerbated turbo lag when the intake air density is low, for example if the vehicle 10 is at high altitude.

FIG. 1 shows a vehicle powertrain 22 that is configured to transmit torque from the engine 20 to the road wheels 14, 18. The powertrain 22 includes an automatic transmission 24 that extends longitudinally between the engine 20 and a transfer case 26, to transfer torque output by the engine 20 to the transfer case 26. In turn, the transfer case 26 is configured to divide the torque for delivery to both a rear driveshaft 28 and a front driveshaft 30.

The rear driveshaft 28 extends longitudinally and coaxially with the transmission 24 to couple to and transmit torque to the rear axles 12 and thus drive the rear road wheels 14. The front driveshaft 30 extends in the opposite direction to the rear driveshaft 28 and in parallel to the transmission 24, to couple to the front axles 16 beneath the engine 20 and thereby transmit torque to the front axles 16 to drive the front road wheels 18.

The automatic transmission 24 may be of any suitable type, for example a hydraulic automatic transmission. The internal components of the automatic transmission 24 are not shown in FIG. 1 to avoid obscuring the invention with unnecessary detail, but the skilled person will appreciate that such transmissions typically include a set of planetary gearsets to provide the required gearing ratios, and a torque converter to couple the engine 20 output to the planetary gearsets.

The automatic transmission 24 is controlled by a powertrain control module (PCM) 32, which combines the functions of an engine control unit (ECU) and a transmission control unit (TCU). In other embodiments, a separate ECU and TCU may be used instead.

The PCM 32 is responsible for controlling operation of both the engine 20 and the automatic transmission 24. In this respect, the PCM 32 receives input data from a suite of on-board sensors and generates control signals that are transmitted to the engine 20 or to the automatic transmission 24 as appropriate. The input data may include indications of, for example, the currently-selected gear, engine speed, engine load, road wheel speed, exhaust gas flow rate, engine intake pressure, vehicle operating mode, accelerator pedal position and many more. The skilled reader will appreciate that obtaining such data from standard on-board sensors is entirely conventional and common to most modern vehicles, and so this will not be described in more detail here.

However, two particular elements of the data that are received by the PCM 32 are relevant to a method of controlling the vehicle 10 to account for reduced intake air density that shall be described later. These elements are: an indication of barometric pressure; and an indication of ambient temperature. In this respect, a pressure sensor 34 that is configured to generate a signal indicative of ambient barometric pressure is attached to the engine 20. Similarly, a temperature sensor 36 configured to generate a signal indicative of ambient temperature is disposed within the vicinity of the engine 20 as shown in FIG. 1 or within a wing mirror, for example. These signals, which are indicative of the intake air density either individually or, especially, in combination, are then transmitted to the PCM 32 by any suitable means, for example using a vehicle CAN bus 38.

Regarding the control signals issued to the automatic transmission 24 by the PCM 32, these typically consist of either a command to upshift, namely to select a higher gear ratio than that at which the transmission 24 is currently operating, or a command to downshift, namely to select a lower gear ratio than is currently in use. Typically, upshift or downshift commands effect an incremental increase in gear ratio to adopt an adjacent gear ratio, but it is possible for a command to effect an upshift or a downshift that skips the adjacent gear ratio in some conditions.

As already noted, gear shifts are implemented in accordance with a selected gear shift map, which defines the points at which an upshift or a downshift is triggered based on vehicle operating parameters, in particular the engine speed and the position of the accelerator pedal. The PCM 32 selects from a set of gear shift maps according to instantaneous operating conditions. For example, if the automatic transmission 24 is set to a 'sport' operating mode, the PCM 32 selects a corresponding gear shift map—which would typically exhibit relatively aggressive gear change behaviour in which gear changes are triggered at relatively high engine speeds—and controls the transmission 24 accordingly.

It is noted that, in this context, 'aggressive' refers to a strategy that tends to trigger gear shifts at relatively high engine speeds and/or accelerator pedal displacements.

Figure 2:
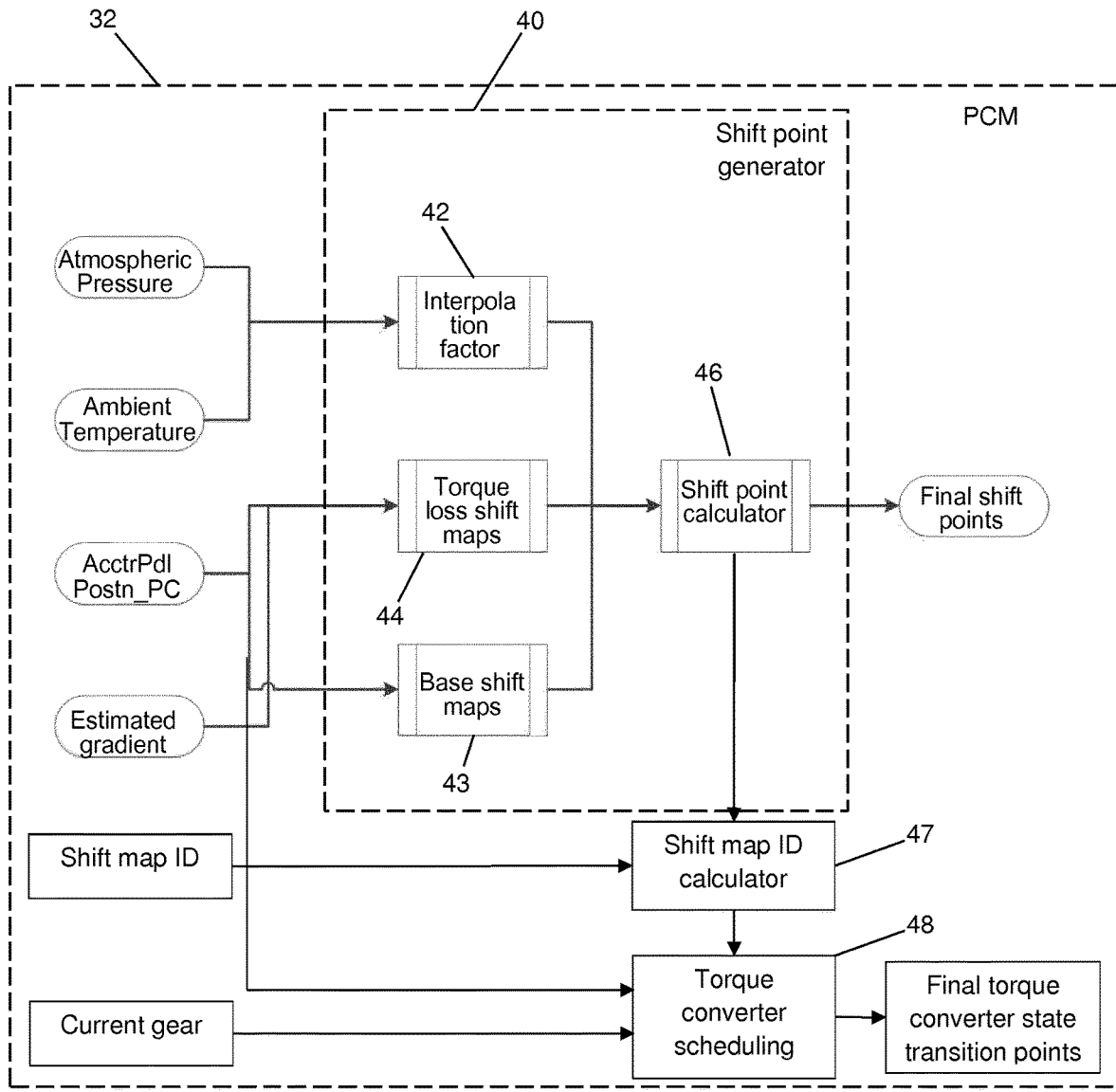
FIG. 2 is a block diagram representing a powertrain control module of the vehicle of FIG. 1.

FIG. 2 represents the PCM 32 in block diagram form. As shown, the PCM 32 includes a shift point generator (SPG) 40, which is a functional module that is integrated within the PCM 32 that has responsibility for generating arrays of gear shift points based on a set of calibrated gear shift maps alongside inputs representing instantaneous operating conditions for the vehicle 10.

The SPG 40 may be provided as a discrete software component of the PCM 32, or as a dedicated circuit within the PCM 32. In other embodiments, the PCM 32 need not include a distinct SPG 40, and may simply integrate the required functionality within its main architecture, for example.

In the example shown in FIG. 2, a set of four inputs is delivered to the SPG 40, those inputs having been received by the PCM 32 from a range of distributed sensors and other sources throughout the vehicle 10. The inputs shown in FIG. 2 include: an indication of atmospheric pressure as received from the pressure sensor 34; an indication of ambient temperature as received from the temperature sensor 36; an indication of the position of the accelerator pedal position (AcctrPdPostn_Pc); and an estimated gradient as calculated by the PCM 32 based on inputs such as vehicle acceleration and torque data.

Other combinations of inputs, including some not mentioned here, may be used in different embodiments. For example, GPS data may be used to determine the altitude at which the vehicle 10 is located, which in turn is indicative of the ambient air density.

The SPG 40 includes three sub-modules: an interpolation factor module 42; a base shift maps module 43; a torque loss shift maps module 44; and a shift point calculator module 46.

The interpolation factor module 42 makes use of the indicated ambient pressure and temperature to calculate an interpolation factor that represents the extent to which the torque output of the engine 20 is reduced by any reduction in intake air density. Accordingly, the interpolation factor is used for interpolating between gear shift maps to account for the effect of intake air density on engine output torque.

In this respect, the interpolation factor module 42 receives signals that are indicative of ambient temperature and pressure, and generates an interpolation factor accordingly.

For example, as decreasing air density, for example as a result of increasing altitude, tends to reduce the torque output of the engine 20, the interpolation factor is determined to drive interpolation towards more aggressive shifting strategies when the indicated ambient pressure and temperature are indicative of low ambient air density compared with strategies used at sea level where air density is higher. The interpolation ensures that the shifting strategy becomes increasingly aggressive as altitude rises.

The interpolation factor module 42 may obtain the required interpolation factor from a look-up table of calibrated values, for example. Alternatively, the interpolation factor module 42 may employ a mathematical function or map that has been derived from experimental data, theoretical modelling or a combination of the two.

The interpolation factor may be determined using the indicated temperature and pressure directly, with reference to a three-dimensional compensation map that plots temperature and pressure against the interpolation factor, for example. Alternatively, the indicated temperature and pressure may be used to estimate the ambient intake air density, which can then be translated into an interpolation factor using a two-dimensional map.

The torque loss shift maps module 44 comprises a readable memory that holds a set of gear shift maps, each corresponding to a different gradient, to account for the increased power required from the engine 20 when climbing a hill and conversely the decreased power required when descending a hill. For example, a respective map may be provided for each 2% increase in gradient.

Each of the maps held by the torque loss shift maps module 44 defines a shifting strategy that corresponds to a predetermined minimum value of air density which may correspond to a minimum air density at which the vehicle 10 is expected to operate, which may in turn broadly correspond to a maximum altitude at which the vehicle 10 is intended to operate, for example. The torque loss shift maps module 44 therefore defines a shifting strategy that corresponds to maximum level of compensation that can be applied to a default shifting strategy for a 'drive' mode to account for reduced air density at the respective road gradient.

The torque loss shift maps module 44 receives the indication of the estimated gradient of the surface on which the vehicle 10 is located, and uses the indication to select an appropriate pair of gear shift maps from within the set held in its memory. The torque loss shift maps module 44 then interpolates between those two maps to produce a gear shift map that corresponds specifically to the estimated gradient. For example, if the estimated gradient is 5%, the torque loss shift maps module 44 may interpolate between a map calibrated for 3% gradient and a map calibrated for 7% gradient to determine an interpolated shift map for the estimated gradient.

The torque loss shift maps module 44 also receives the indication of the accelerator pedal position, and extracts from the interpolated gear shift map an array of gear shift points corresponding to the indicated pedal position. This array of gear shift points is referred to as the torque loss map, and is forwarded to the shift point calculator module 46.

The shift point calculator module 46 also receives a set of shift points based on the present vehicle operating mode, estimated gradient and accelerator pedal position, referred to as the base map.

The base shift map is generated by the base shift maps module 43, by identifying the set of gear shift maps corresponding to the present operating mode, and then interpolating between the two maps of that set that represent gradients immediately above and below the estimated gradient to produce an interpolated map that relates specifically to the estimated gradient and present operating mode. In this respect it is noted that, like the torque loss shift maps module 44, the base shift maps module 43 comprises a readable memory that holds sets of predefined gear shift maps, each set corresponding to a different operating mode and each map within each set corresponding to a different gradient. For example, the base shift maps module 43 may hold 100 predefined maps in total. The base shift maps module 43 selects the appropriate pair of maps from among the predefined maps based on indications of the operating mode and gradient.

For this purpose, the base shift maps module 43 receives an indication of the vehicle operating mode currently in use (not shown on FIG. 2), in addition to the indication of the estimated gradient of the surface on which the vehicle 10 is located and the indication of the accelerator pedal position.

Finally, a set of gear shift points is extracted from the interpolated map based on the accelerator pedal position to define the base map.

The base map may also be adjusted according to historical data that is indicative of the driver's driving style. For example, if the driver has previously exhibited relatively aggressive driving behaviour, the base map is modified to adopt a more aggressive profile. In this respect, the signal indicative of the position of the accelerator pedal may be monitored and the rate of change of the pedal position determined, to provide an indication of how aggressively the driver tends to accelerate. Adjusting the base map may entail dynamically updating the base map in real-time, or re-calibrating all of the predefined maps held by the base shift maps module 43 over time, for example.

It is noted at this stage that a gear shift map may take various forms, including an array or matrix of values such as look-up table, or a mathematical function. In the example shown in FIG. 2, the SPG 40 is configured to adopt the former of these approaches, to output gear shift maps in the form of a set or array of gear shift points represented numerically.

It is also noted that the term 'gear shift map' does not necessarily entail an overall and complete representation of every shift point for any operating condition and any selected gear; although the term does encompass this. Instead, a gear shift map may include only a sub-set of the values representing every scenario, and in particular may only indicate gear shift points for a currently-selected gear and for the present accelerator pedal position.

Typically, a gear shift map may comprise a two-dimensional array that sets out base shift points, namely engine speeds at which gear shifts are triggered, for a particular scenario over the full range of pedal angles for every gear shift possible. This cannot cover all operating conditions, and so shift maps are interpolated between and modified by downstream functions to account for current vehicle operating conditions.

It is noted that in practice gear shifts may alternatively be triggered by vehicle road speed instead of engine speed, to enable flexibility in control of the engine 20.

The shift point calculator 46 uses linear interpolation to interpolate between the base map and the torque loss map using the interpolation factor provided by the interpolation factor module 42.

This results in a set of shift points defining a compensated map that is a blend of the torque loss map and the base map and thereby compensates for ambient air density for the current operating mode and estimated gradient.

The interpolation factor may lie in a range of 0 to 1, for example, where 0 represents an interpolation that is weighted entirely towards the base map, and 1 represents an interpolation that is weighted entirely towards the torque loss map. So, if the interpolation factor output by the interpolation factor module 42 is 0, for example because the vehicle 10 is at sea level and so the air density is high, the compensated map corresponds exactly to the base map. Alternatively, if the interpolation factor is 0.5, indicating reduced intake air density, the shift points of the compensated map lie halfway between the corresponding shift points of the base map and the torque loss map.

Noting that it is desirable to ensure that the gear shift map that is ultimately used for controlling the transmission 24 is sufficiently aggressive whilst also ensuring that the acceleration performance of the vehicle 10 is not less than would be expected for the current operating mode, the shift point calculator module 46 then acts as a comparator by comparing the compensated map with the base map to determine which is the most aggressive.

The shift point calculator module 46 then takes whichever of the base map and the compensated map is found to be the most aggressive forward as a final gear shift map. The final gear shift map is then used by the PCM 32 to control the transmission 24.

In this way, the SPG 40 ensures that the most aggressive shift strategy available is selected at all times. Therefore, for example, if the vehicle 10 is in a 'sport' mode or a 'super sport' mode, which would likely define more aggressive shift strategies than one that is compensated for gradient and air density, the more aggressive profile of the sport mode or super sport mode is retained. This avoids compromising the selected operating mode unnecessarily.

It will be appreciated that the above steps are iterated continuously to account for changes in accelerator pedal position, estimated gradient, operating mode, the selected gear and so on, so that the PCM 32 provides dynamic control of the transmission 24.

Alongside updating the gear shift map to account for ambient air density, for improved refinement locking and unlocking points for the torque converter of the automatic transmission 24 are updated in a complementary manner.

In this respect, as is common for automotive applications, the torque converter includes a turbine and an impeller that are fluidly coupled to transfer torque from the engine to the transmission, and a lock-up clutch that is operable to couple the turbine to the impeller mechanically when the transmission speed approximately matches the engine speed. This reduces slippage and so improves the efficiency of the torque converter when the speed differential is low.

Ideally the torque converter would always be locked for optimised tip-in response, but this would lead to engine stalling when the transmission speed drops. So, the torque converter is unlocked when the vehicle is stationary and also typically around gear changes.

Although operation with default locking/unlocking maps would be possible against varying gear shift maps, this could lead to a loss of refinement if, for example, the torque converter unlocked too far in advance of a gear shift.

Accordingly, to optimise operation of the transmission 24, as FIG. 2 shows the PCM 32 includes further processing modules not forming part of the SPG that are used to determine state transition points for the torque converter, namely points at which the torque converter locks or unlocks. Specifically, the PCM 32 includes a shift map ID calculator 47 and a torque converter scheduling module 48.

The shift map ID calculator 47 receives as an input from the shift point calculator 46 a main shift map ID, namely an identifier for one of the predefined torque loss maps held by the torque loss shift maps module 44; specifically, the predefined map corresponding to a gradient that is closest to the estimated gradient. The main shift map ID also includes an indication of the interpolation factor calculated by the interpolation factor module 42.

The shift map ID calculator 47 also receives a further input, namely a shift map ID representing an identifier for one of the predefined base maps held by the base shift maps module 43; specifically, whichever of the predefined maps corresponds to the present vehicle operating mode and is closest to the estimated gradient. The shift map ID is available internally within the PCM 32.

The shift map ID calculator 47 includes a readable memory that holds a set of locking/unlocking maps by which to control the lock-up clutch of the torque converter, these maps being analogous to the gear shift maps used to control gear shifts in the transmission 24. In this respect, each locking/unlocking map corresponds to a different operating mode and/or torque loss due to ambient air density based on estimated gradient.

The shift map ID calculator cross-references the locking/unlocking maps it holds with the shift map ID and the main shift map ID that it receives as inputs, to retrieve a corresponding base locking/unlocking map and torque loss locking/unlocking map respectively. By using the respective map IDs, this process inherently leads the shift map ID calculator 47 towards locking/unlocking maps that are already calibrated for the estimated gradient. Similarly, if the base map has also been adjusted to account for the driver's style based on historical data, this will also feed into the selection of the base locking/unlocking map.

The shift map ID calculator 47 then interpolates between the base and torque loss locking/unlocking maps using the interpolation factor to generate a compensated locking/unlocking map that takes into account ambient air density.

Finally, as for the gear shift maps, the final locking/unlocking map that is taken forward is that corresponding to the most aggressive gear shift profile. Accordingly, the shift map ID calculator compares the compensated locking/unlocking map with the base locking/unlocking map, and selects the more aggressive of the two by which to control state transitions in the torque converter.

The selected locking/unlocking map is then passed to the torque converter scheduling module 48, which also receives further inputs in the form of indications of the currently-selected gear and the accelerator pedal position. These are used to extract the appropriate locking/unlocking points from the selected locking/unlocking map, which are output as shown in FIG. 2 as the final torque converter state transition points that are taken forward and used to control operation of the torque converter.

In summary, the state transition points for the torque converter are determined in an analogous manner to the gear shift points by interpolating between a map based on the operating mode and a map based on ambient air density, each being adjusted to account for the effect of gradient, and then comparing the map based on operating mode with the interpolated map to select the most aggressive of the two.

Configuring the PCM 32 to determine the final torque converter transition points in this way and somewhat separately from the gear shift maps calculation offers flexibility in control, in that the PCM 32 can tailor the process according to the specific factors that impact operation of the torque converter to provide desired behaviour.

However, the skilled reader will appreciate that there are various other possible ways of determining an updated locking/unlocking map for the torque converter to account for changes to the gear shift map used by the PCM 32. For example, the final shift points output by the SPG 40 could be converted directly into a corresponding set of state transition points for the torque converter.

Figure 3:
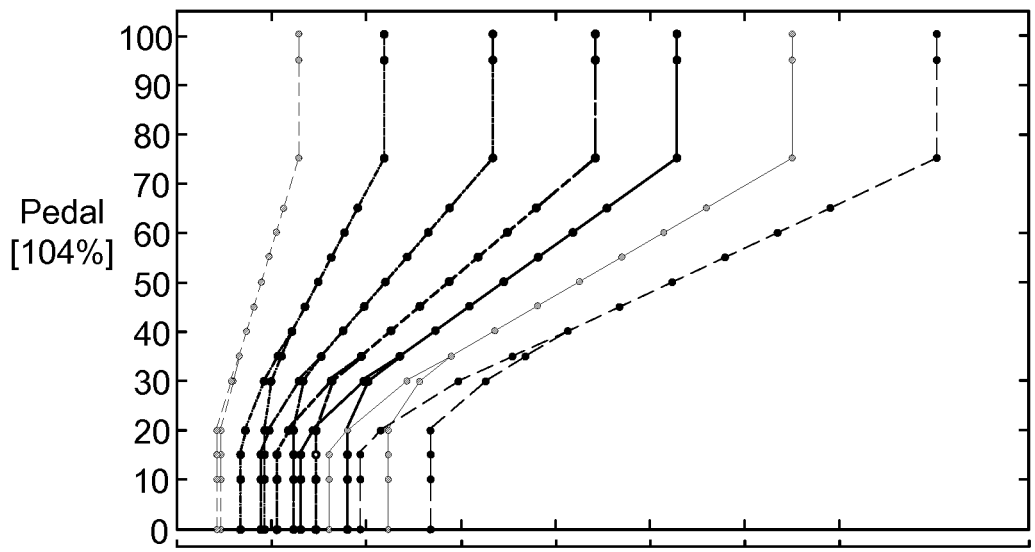
FIG. 3 is a graph showing an upshift map output by the powertrain control module of FIG. 2.
Figure 4:
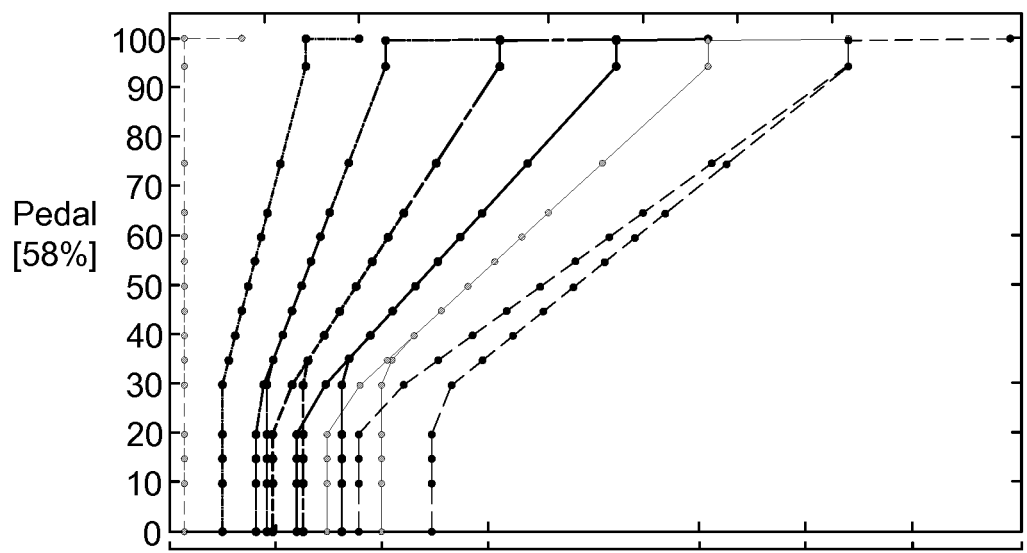
FIG. 4 is a graph showing a downshift map output by the powertrain control module of FIG. 2.

FIGS. 3 and 4 represent gear shift maps for a vehicle 10 travelling on a level surface at both sea level and at high altitude where ambient air density is low. FIG. 3 represents a map of upshift points, whereas FIG. 4 represents a map of downshift points.

Turning first to FIG. 3, a set of seven lines are shown, each corresponding to a respective set of shift points between neighbouring gear ratios of the automatic transmission 24 based on both output shaft speed, which is plotted on the x-axis, and accelerator pedal position, which is plotted on the y-axis. The line shown furthest to the left in FIG. 3 corresponds to a shift from first gear to second gear, for example. As there are six further lines representing respective sets of gear shift points shown in FIG. 3, it follows that the automatic transmission 24 is an eight speed gearbox.

Each line is vertical in its lowermost and uppermost regions, corresponding to low pedal depression and high pedal depression. In these regions, varying the pedal position has no effect on the shift point, which is determined entirely based on speed.

However, between the vertical regions the line is inclined towards the upper right-hand corner of the graph, meaning that increasing the pedal depression within that region in turn increases the speed at which an upshift is triggered. This illustrates how the gear shift map is responsive to the demands of a driver for more aggressive acceleration at times, as indicated by increased depression of the accelerator pedal.

As noted above, the base shift map may be adjusted according to the driver's past driving behaviour. This may be achieved, for example, by interpolating between a set of potential base maps, each calibrated for different driver behaviour. This alters the shape of the base map and the values contained within it, to provide a more aggressive profile as required. For example, upshifts occurring at wide open throttle (i.e. upshifts occurring when the indication of the accelerator pedal position corresponds to a fully depressed pedal) may be reconfigured to occur at lower values of pedal depression (for example 90%), and downshifts may be reconfigured to occur at higher output shaft speeds. This provides more aggressive downshifts, keeping the engine 20 at consistently higher engine speeds even if the pedal is released.

In the lowermost regions, the lines have two branches, each of which corresponds to a different driving scenario. The branches to the left in FIG. 3, which are labelled with circular markers, correspond to when the vehicle 10 is at sea level and so represent the base map referred to above. The branches to the right, which include square markers, correspond to driving at high altitude and so correspond to the compensated map referred to above.

In this way, the compensated map provides a more aggressive strategy when the vehicle 10 is at high altitude and engine output is compromised and turbo lag is exacerbated, therefore compensating for these problems.

The branches converge at points corresponding to between 30 and 40% accelerator pedal depression, which correspond to engine speeds above which the engine output is sufficient for the altitude, and also that are comfortably above an engine speed at which the turbocharger begins to provide effective boosting at that altitude. This allows the vehicle 10 to return to its normal behaviour where possible, thus minimising the impact of air density compensation.

FIG. 4 is generally similar in form to FIG. 3, but exhibits gear shift maps that are generally shifted to the left relative to FIG. 3, corresponding to the fact that downshifts tend to occur at lower engine speeds than upshifts to maximise efficiency by delaying downshifts for as long as possible.

Figure 5:
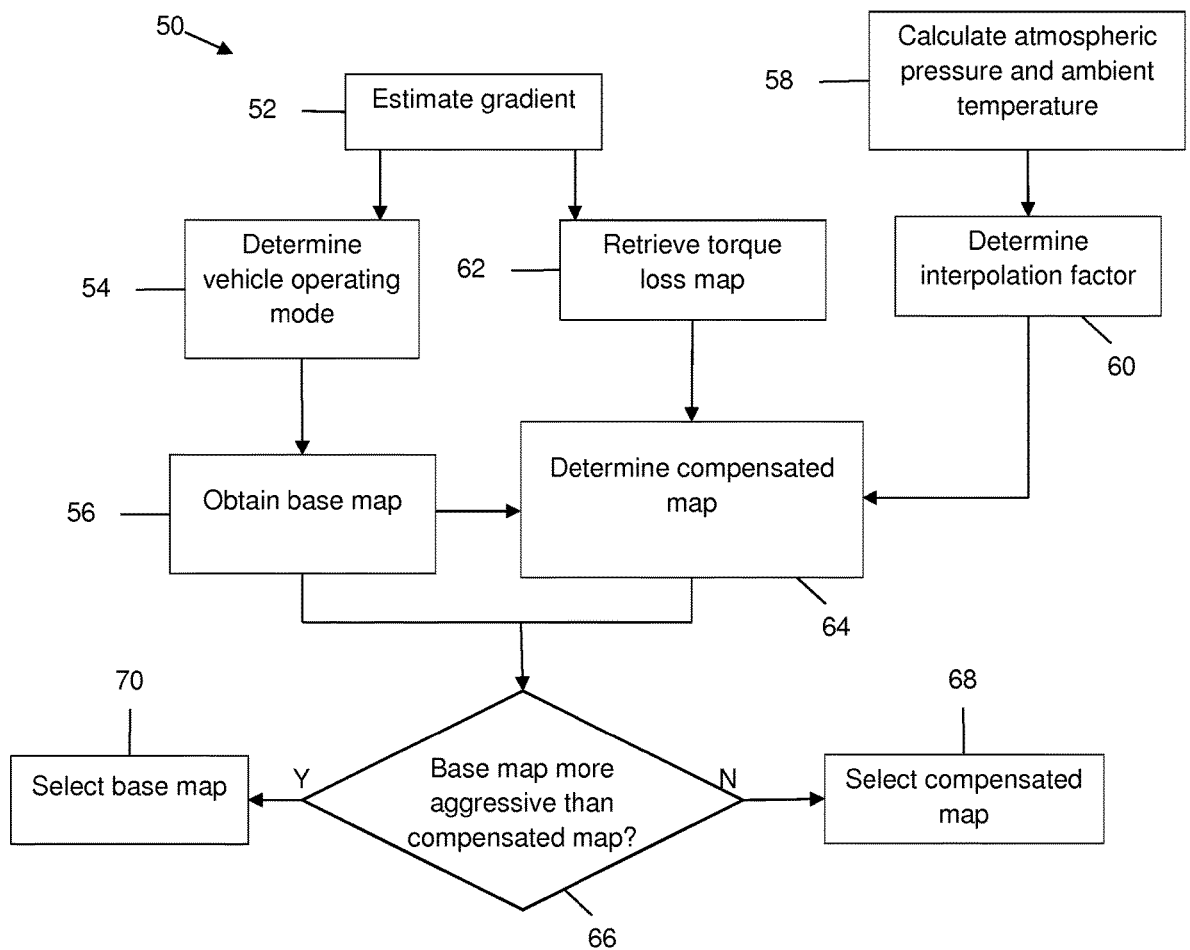
FIG. 5 is a flow diagram representing a process according to an embodiment of the invention for selecting an appropriate gear shift map to control the vehicle of FIG. 1.

FIG. 5 is a flow diagram representing a simplified process 50 according to an embodiment of the invention that the PCM 32 uses to select a final gear shift map on which to base control of the automatic transmission 24.

The process begins with the PCM 32 estimating at step 52 the gradient of the surface on which the vehicle 10 is travelling using any one of the techniques already mentioned or those familiar to the skilled person. Next, the PCM 32 determines at step 54 the current vehicle operating mode. The PCM 32 then generates at step 56 a base map according to the estimated gradient and operating mode as described above. Although not shown in FIG. 5, the PCM 32 may adjust the base map at this stage to account for previous driver behaviour to make the base map more or less aggressive as appropriate.

The base map is forwarded to the shift point calculator module 46 of the SPG 40, as described above.

In parallel, the PCM 32 receives at step 58 one or more signals that are indicative of the ambient air density for the vehicle 10, for example a measurement of the barometric pressure and, to a lesser extent, the ambient temperature. These signals are delivered to the interpolation factor module 42 of the SPG 40, which uses them to determine at step 60 an interpolation factor.

The estimated gradient is also sent to the torque loss shift maps module 44 along with a signal indicative of the accelerator pedal position. The torque loss shift maps module 44 then produces at step 62 a corresponding torque loss map based on the estimated gradient and indicated pedal position in the manner described earlier.

The base map and the torque loss map are then combined by the shift points calculator module 46 using linear interpolation based on the interpolation factor to produce at step 64 a compensated map. The compensated map therefore exhibits a shifting strategy that has been adjusted relative to the base map in view of the indicated ambient air density for the present operating mode and estimated gradient.

The compensated map is then compared at step 66 with the base map to see which is the more aggressive. If the base map is the most aggressive, which may be likely if the vehicle 10 is in 'sport' mode, for example, then the base map is taken forward at step 68 as a final shift point map according to which the PCM 32 operates the transmission 24. Otherwise, the compensated map is taken forward at step 70 as the final shift point map.

Many modifications may be made to the above examples without departing from the scope of the present invention as defined in the accompanying claims.

For example, although the above described embodiments of the invention relate to a vehicle 10 having a turbocharged engine 20, other embodiments are applicable to other types of engine, including supercharged and naturally-aspirated engines. In these alternative engine types, there is no issue of turbo lag to consider. This may simplify the process of producing a compensated map, due to the change in engine characteristics.

To reduce the burden on computing resources, the above described air density compensation function may be disabled for certain vehicle operating modes. For example, if a 'sport' mode is selected, in which a compensated shift strategy is unlikely to be more aggressive than the base shifting strategy, disabling the function may be sensible.

It is noted that barometric pressure readings may be considered indicative of altitude. Therefore, references to barometric pressure in the above description may be considered equivalent to references to altitude where appropriate. Furthermore, uses of pressure measurements in the above described embodiments may be supplemented by or substituted for other indications of altitude, such as a direct indication of altitude provided by an on-board navigational system such as a Global Navigational Satellite System (GNSS).

In a variant to the above described control process, the PCM 32 may compare the base map with the torque loss map to see which is the most aggressive, and then only interpolate between the two maps to produce a compensated map in the event that the base map is less aggressive than the torque loss map. Noting that the interpolation can only produce a compensated map that is more aggressive than the base map if the torque loss map is more aggressive than the base map, swapping the order of these steps of the control process may dispense with the need to perform the interpolation, thereby relieving the burden on computing resources of the PCM 32.

The invention claimed is:

1. A method of controlling an automatic transmission of a vehicle, the method comprising:
   receiving a signal indicative of a vehicle operating mode;
   obtaining a base map defining gear shift points for the transmission based on the indicated vehicle operating mode;
   obtaining a torque loss map defining gear shift points for the transmission based on a predetermined minimum value of air density;
   controlling the transmission based on the base map if the base map defines gear shift points at higher engine speeds or vehicle speeds than the corresponding gear shift points defined by the torque loss map; and
   obtaining a signal indicative of a gradient of a surface on which the vehicle is positioned by estimating a gradient of a surface on which the vehicle is positioned, or receiving a signal indicative of a gradient of a surface on which the vehicle is positioned.

2. The method of claim 1, comprising receiving one or more signals indicative of ambient air density and obtaining a compensated map defining gear shift points for the transmission based on the or each signal indicative of ambient air density.

3. The method of claim 2, wherein obtaining the compensated map comprises interpolating between the torque loss map and the base map in accordance with the or each signal indicative of ambient air density.

4. The method of claim 3, wherein obtaining the compensated map comprises determining an interpolation factor based on the one or more signals indicative of ambient air density and interpolating between the torque loss map and the base map according to the interpolation factor.

5. The method of claim 1, comprising adjusting the torque loss map according to the estimated gradient wherein adjusting the torque loss map comprises selecting a torque loss map from a set of torque loss maps based on the indicated gradient, wherein each torque loss map of the set is calibrated for a respective surface gradient.

6. The method of claim 5, wherein adjusting the torque loss map comprises selecting a pair of torque loss maps from the set of torque loss maps and interpolating between the pair of torque loss maps to generate a torque loss map for the indicated gradient of the surface on which the vehicle is positioned.

7. The method of claim 1, comprising adjusting the base map according to the estimated gradient.

8. The method of claim 7, wherein adjusting the base map comprises selecting a base map from a set of base maps based on the indicated gradient of a surface on which the vehicle is positioned, wherein each base map of the set is calibrated for a respective surface gradient and optionally selecting a pair of base maps from the set of base maps, and interpolating between the pair of base maps to generate a base map for the indicated gradient of the surface on which the vehicle is positioned.

9. The method of claim 8, wherein adjusting the base map comprises selecting a pair of base maps from the set of base maps and interpolating between the pair of base maps to generate a base map for the indicated gradient of the surface on which the vehicle is positioned.

10. The method of claim 1, comprising receiving a signal indicative of a position of an accelerator pedal of the vehicle.

11. The method of claim 10, wherein at least one of the base map and the torque loss map defines engine speeds or vehicle speeds at which gear changes are effected based on the signal indicative of the position of the accelerator pedal.

12. The method of claim 10, comprising receiving one or more signals indicative of ambient air density and obtaining a compensated map defining gear shift points for the transmission based on the or each signal indicative of ambient air density and wherein the compensated map defines engine speeds or vehicle speeds at which gear changes are effected based on the signal indicative of the position of the accelerator pedal.

13. The method of claim 10, comprising monitoring the signal indicative of the position of the accelerator pedal to characterize driver behavior, and adjusting the base map according to the driver behavior.

14. The method of claim 1, comprising updating points at which a torque converter of the automatic transmission is locked and unlocked in accordance with the gear shift points by which the transmission is controlled.

15. A controller configured to implement the method of claim 1.

16. A non-transitory computer readable medium comprising computer readable code for controlling a computing device to perform the method according to claim 1.

17. A controller configured to control an automatic transmission of a vehicle, the controller comprising:

an input arranged to receive a signal indicative of a vehicle operating mode;

a base map module configured to obtain a base map defining gear shift points for the transmission based on the indicated vehicle operating mode;

a torque loss map module configured to obtain a torque loss map defining gear shift points for the transmission based on a predetermined minimum value of air density;

a comparator configured to compare the base map with the torque loss map to determine whether the base map defines gear shift points at higher engine speeds than the corresponding gear shift points defined by the torque loss map; and an output configured to issue control commands for controlling the transmission based on the base map if the base map defines gear shift points at higher engine speeds than the corresponding gear shift points defined by the torque loss map, wherein the controller is configured to obtain a signal indicative of a gradient of a surface on which the vehicle is positioned by estimating a gradient of a surface on which the vehicle is positioned, or receiving a signal indicative of a gradient of a surface on which the vehicle is positioned.

18. A vehicle comprising an automatic transmission and the controller according to claim 17.

* * * * *